United States Patent
Kim

(10) Patent No.: US 11,410,654 B2
(45) Date of Patent: Aug. 9, 2022

(54) SOUND SYSTEM OF VEHICLE AND CONTROL METHOD THEREOF

(71) Applicants: Hyundai Motor Company, Seoul (KR); Kia Motors Corporation, Seoul (KR)

(72) Inventor: Youngbeom Kim, Bucheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/090,194

(22) Filed: Nov. 5, 2020

(65) Prior Publication Data

US 2022/0036895 A1 Feb. 3, 2022

(30) Foreign Application Priority Data

Jul. 31, 2020 (KR) .................. 10-2020-0096283

(51) Int. Cl.
| *H04B 1/00* | (2006.01) |
| *G10L 15/22* | (2006.01) |
| *G10L 15/25* | (2013.01) |
| *H04R 1/02* | (2006.01) |

(52) U.S. Cl.
CPC .............. *G10L 15/22* (2013.01); *G10L 15/25* (2013.01); *H04R 1/02* (2013.01)

(58) Field of Classification Search
CPC ........................................... H04B 1/00
See application file for complete search history.

(56) References Cited

U.S. PATENT DOCUMENTS

| 11,070,911 B2* | 7/2021 | Groene | G10K 11/17885 |
| 2016/0029111 A1* | 1/2016 | Wacquant | H04R 3/005 |
| | | | 381/71.4 |
| 2019/0037363 A1* | 1/2019 | Tzirkel-Hancock | H04R 3/12 |
| 2020/0186920 A1* | 6/2020 | Geng | H04R 3/005 |
| 2021/0061152 A1* | 3/2021 | Servadio | B60R 11/0217 |
| 2021/0098014 A1* | 4/2021 | Tanaka | G10K 11/34 |

* cited by examiner

*Primary Examiner* — Olisa Anwah
(74) *Attorney, Agent, or Firm* — Morgan, Lewis & Bockius LLP

(57) ABSTRACT

A vehicle that efficiently prevents a driver from eavesdropping a voice of a passenger may include: a driver's seat having a headrest speaker in a headrest thereof; the headrest speaker configured to output a sound, a front passenger seat, at least one rear passenger seat; a microphone configured to detect a voice of the passenger seated on the at least one rear passenger seat; and a controller configured to generate a masking curve based on the voice of the passenger and output a masking sound corresponding to the masking curve by controlling the headrest speaker.

18 Claims, 11 Drawing Sheets

SOUND SYSTEM OF VEHICLE AND CONTROL METHOD THEREOF

CROSS-REFERENCE TO RELATED APPLICATION

This application is based on and claims priority to Korean Patent Application No 10-2020-0096283, filed on Jul. 31, 2020 in the Korean Intellectual Property Office, the disclosure of which is incorporated herein by reference.

TECHNICAL FIELD

The present disclosure relates to a vehicle and a control method thereof, and more particularly, to a vehicle that controls a headrest speaker of a driver's seat to prevent a driver from hearing a voice of a passenger located in a rear seat, and a control method thereof.

BACKGROUND

A vehicle is capable of transporting people or objects to a destination while driving on a road or track. The vehicle can move to various locations by rotation of one or more wheels installed on the vehicle body. Such a vehicle may include a three-wheeled or four-wheeled vehicle, a two-wheeled vehicle such as a motorcycle, a construction machine, a bicycle, and a train running on a rail disposed on a track.

In addition, the vehicle performs a navigation function, a telephone function, an audio function, a radio function, a broadcast function, a text message service function, an internet function, etc., and recently, various software for performing more various and complicated functions are built-in together.

The demand level of the driver or passenger in the vehicle is increasing day by day, and in order to comply with this, the level of interlocking technology between the vehicle and an external terminal such as a smart phone is also increasing.

In the case of a luxury vehicle, the actual purchaser of the vehicle rides in the rear seat, and a driver hired from the actual purchaser often drives the vehicle.

At this time, when the actual purchaser in the rear seat of the vehicle has a conversation including important content with a third party other than the driver, the conversation may be exposed to the driver.

The information included in this Background section is only for enhancement of understanding of the general background of the present disclosure and may not be taken as an acknowledgement or any form of suggestion that this information forms the prior art already known to a person skilled in the art.

SUMMARY

It is an aspect of the present disclosure to provide a vehicle that prevents a driver from hearing a voice of a passenger by controlling a headrest speaker provided in a driver's seat based on the voice of the passenger located in the rear seat, and a control method thereof.

In accordance with one aspect of the disclosure, a vehicle includes: a driver's seat having a headrest speaker in a headrest thereof, the headrest speaker configured to output a sound, a front passenger seat, at least one rear passenger seat; a microphone configured to detect a voice of a passenger seated on the at least on rear passenger seat; and a controller configured to generate a masking curve based on the voice of the passenger and output a masking sound corresponding to the masking curve by controlling the headrest speaker.

The controller may be configured to determine at least one peak sound pressure included in the voice of the passenger and generate a masking curve with a frequency corresponding to the peak sound pressure as a center frequency.

The controller may be configured to boost the sound pressure of the masking curve at a frequency corresponding to the peak sound pressure having the largest sound pressure among the at least one peak sound pressure.

The controller may be configured to control the volume of sound output to the headrest speaker based on the sound pressure size of the voice of the passenger.

The vehicle may further include: a camera configured to photograph the passenger, and the headrest speaker may include a left speaker provided on the left side of the headrest of the driver's seat and configured to output sound, and a right speaker provided on the right side of the headrest of the driver's seat and configured to output sound, and the controller may be configured to adjust the volume of sound output to the left speaker and the right speaker based on the position of the passenger photographed from the camera.

When the passenger may be located at the rear of the passenger seat, the controller may be configured to adjust the volume of the sound output to the right speaker higher than the volume of the sound output to the left speaker.

The vehicle may further include: a camera configured to photograph a driver located in the driver's seat, and the headrest speaker may include a left speaker provided on the left side of the headrest of the driver's seat and configured to output sound, and a right speaker provided on the right side of the headrest of the driver's seat and configured to output sound, and the controller may be configured to determine the position of the ear of the driver photographed from the camera, and increase the volume of sound output to the left speaker or the right speaker as the driver's ear is farther from the left speaker or the right speaker.

When the sound pressure of the voice of the passenger may be less than or equal to the preset sound pressure, the controller may be configured to output a masking sound corresponding to a masking curve generated before a preset time by controlling the headrest speaker.

When the sound pressure of the voice of the passenger may be less than or equal to the preset sound pressure, the controller may be configured to increase the volume of the sound output to the headrest speaker.

The vehicle may further include: a display device provided in front of the driver's seat, and when the vehicle is stopped, the controller may be configured to output an image including the shape of a person's mouth by controlling the display device.

The vehicle may further include: a camera configured to photograph a driver located in the driver's seat; and a display device provided at the rear of the driver's seat or at the rear of the passenger seat, and the controller may be configured to recognize the driver's eyes based on the image obtained from the camera, and output a warning through the display device when the driver's eyes close for a preset time.

The vehicle may further include: a pressure sensor configured to measure the force applied to the headrest of the driver's seat; and a display device provided at the rear of the driver's seat or at the rear of the passenger seat, and the controller may be configured to output a warning through the display device when the force measured by the pressure sensor is less than or equal to a preset size.

The vehicle may further include: a AVN device; and a storage configured to store the frequency band input from the driver, and the controller may be configured to set the frequency band of the sound output from the AVN device to the frequency band stored in the storage, and lower the sound pressure of the masking curve in the frequency band stored in the storage when sound is output from the AVN device.

The vehicle may further include: a transceiver configured to receive a preset command from a terminal device of the passenger, and the controller may be configured to output the masking sound by controlling the headrest speaker only when the transceiver receives the preset command.

The controller may be configured to output a preset voice by controlling the headrest speaker when the transceiver receives the preset command.

In accordance with one aspect of the disclosure, a control method of a vehicle, which includes a driver's seat having a headrest speaker in a headrest thereof, the headrest speaker configured to output a sound, a front passenger seat, at least one rear passenger seat and a microphone configured to detect a voice of a passenger seated on the at least one rear passenger seat, includes: receiving the voice of the passenger from the microphone; generating a masking curve based on the voice of the passenger; and outputting a masking sound corresponding to the masking curve by controlling the headrest speaker.

The generating the masking curve based on the voice of the passenger may include: determining at least one peak sound pressure included in the voice of the passenger; and generating a masking curve with a frequency corresponding to the peak sound pressure as a center frequency.

The generating the masking curve with the frequency corresponding to the peak sound pressure as the center frequency may include: boosting the sound pressure of the masking curve at a frequency corresponding to the peak sound pressure having the largest sound pressure among the at least one peak sound pressure.

The control method may further include: controlling the volume of sound output to the headrest speaker based on the sound pressure size of the voice of the passenger.

The control method may further include: adjusting the volume of sound output to the left speaker and the right speaker of the headrest speaker based on the position of the passenger.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
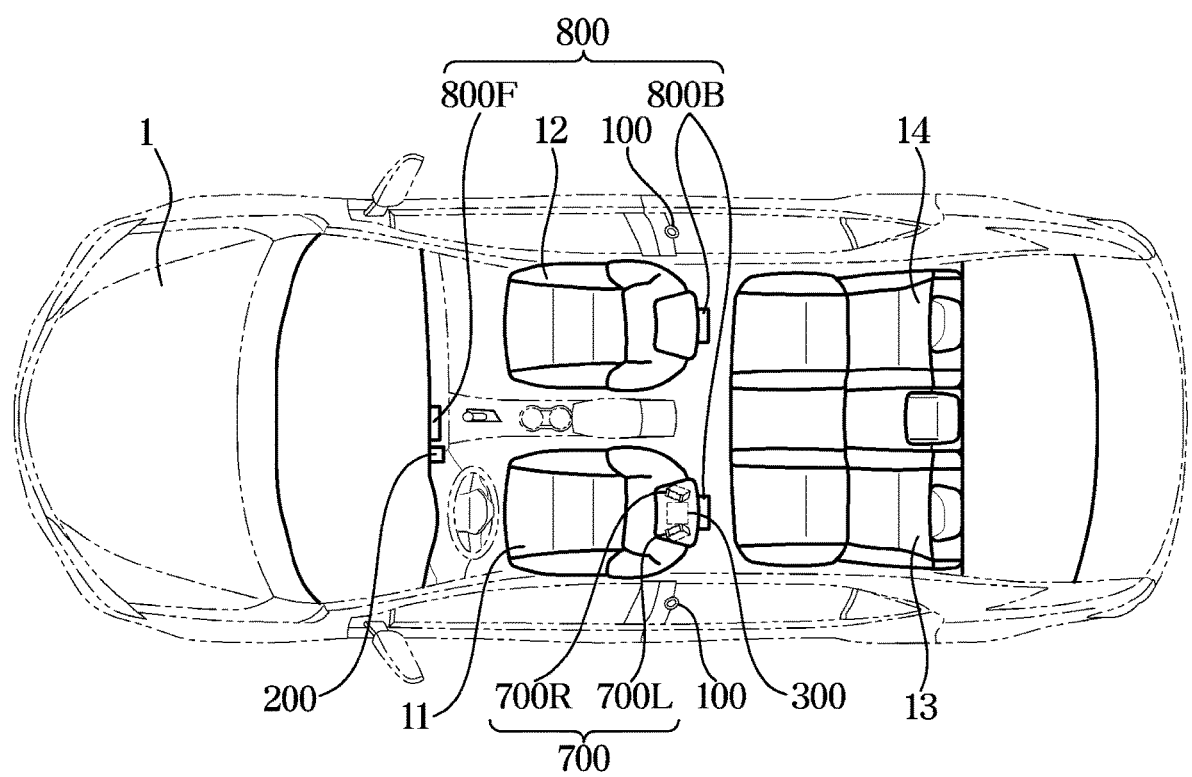
FIG. 1 is a view illustrating an interior of a vehicle according to an embodiment of the present disclosure.

Like reference numerals refer to like elements throughout the specification. Not all elements of embodiments of the disclosure will be described, and description of what are commonly known in the art or what overlap each other in the embodiments will be omitted.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, like reference numerals refer to like elements throughout the specification. This specification does not describe all elements of the embodiments, and in the Field of the disclosure to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

FIG. 1 is a view illustrating an interior of a vehicle according to an embodiment of the present disclosure. FIG.

2 is a control block diagram of a vehicle according to an embodiment of the present disclosure.

For the convenience of explanation below, a drivers seat 11 is defined as a seat in which a driver may sit, a seat next to the driver's seat 11 is defined as a passenger seat 12, and a rear seat of the drivers seat 11 is defined as a first rear seat 13, a rear seat of the passenger seat 12 is defined as a second rear seat 14.

Referring to FIG. 1, a drivers seat 11, a passenger seat 12, a first rear seat 13 and a second rear seat 14 may be provided inside the vehicle 1 according to an embodiment of the present disclosure. However, the number of seats is not limited thereto, and all seats provided at the rear of the driver's seat 11 or the passenger seat 12 may be collectively referred to as rear seats 13 and 14.

Figure 2:
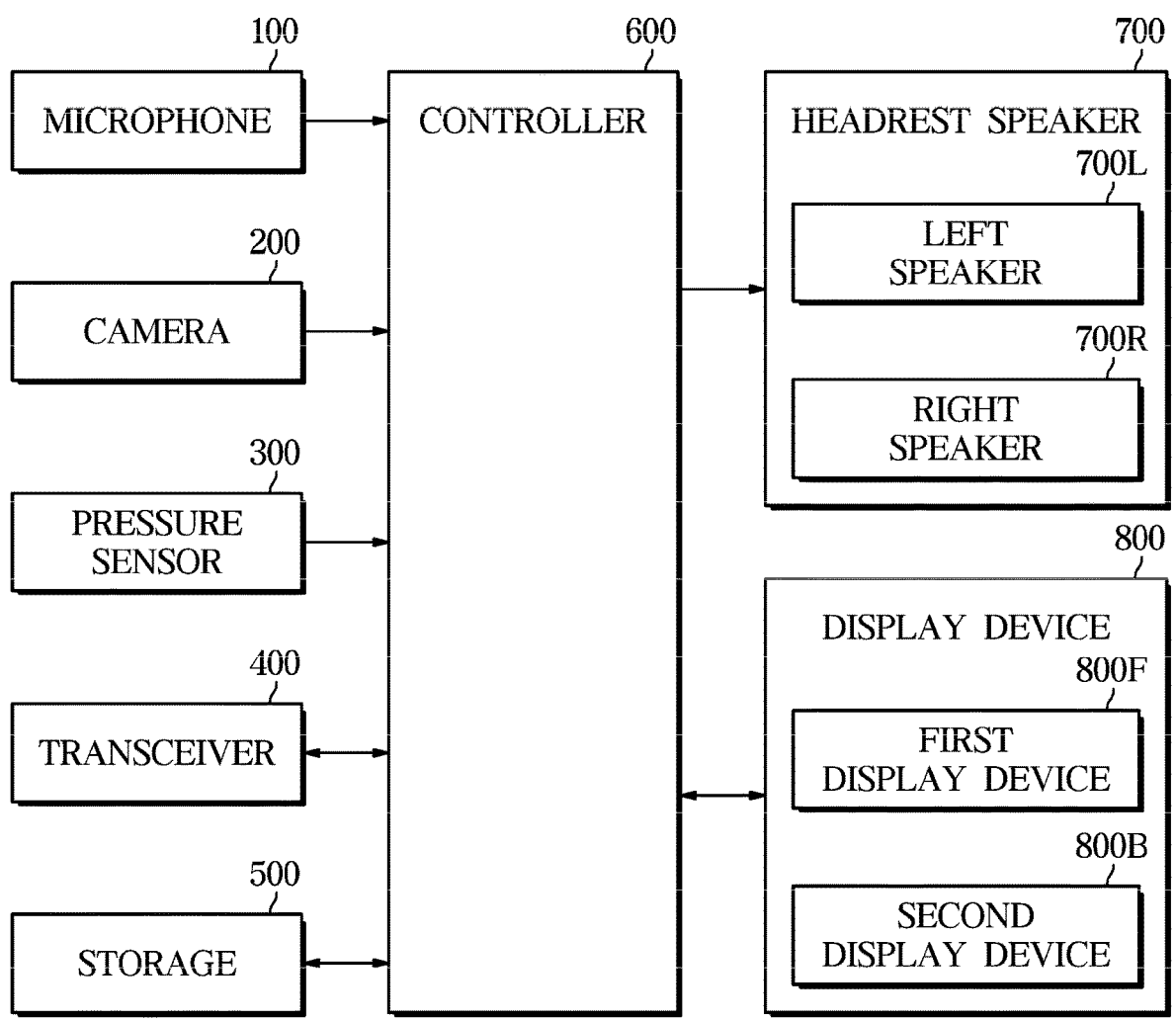
FIG. 2 is a control block diagram of a vehicle according to an embodiment of the present disclosure.

Referring to FIGS. 1 and 2, a vehicle may include a microphone 100 that detects the voice of the passenger located in the rear seat 13 and 14, a camera 200 for photographing a driver located in the driver's seat 11 and/or a passenger in the rear seats 13 and 14, a pressure sensor 300 that measures the force applied to a headrest of the driver's seat 11, a transceiver 400 that communicates with the external terminal device 450, and a storage 500 that stores various information, a controller 600 that controls the headrest speaker 700 and/or the display device 800, the headrest speaker 700 provided in the headrest of the driver's seat 11 to output sound, and a display device 800 that visually outputs various information.

The microphone 100 according to an embodiment of the present disclosure may be provided without limitation as long as it is a position capable of obtaining a voice signal of a passenger located in the rear seats 13 and 14. For example, the microphone 100 may be provided at the rear of the driver's seat 11 and/or at the rear of the passenger seat 12.

The microphone 100 may receive a voice signal of a passenger located in the rear seats 13 and 14, perform processing such as amplification and noise removal, and transmit the processed voice signal of the passenger to the controller 600.

The camera 200 according to an embodiment of the present disclosure may be provided without limitation as long as it is a position capable of photographing a driver located in the driver's seat 11 and/or a passenger of the rear seats 13 and 14. In addition, the number of cameras 200 may be plural. For example, the camera 200 may include a camera provided on the front and upper side of the driver's seat 11 to photograph the driver and/or a camera provided at the rear of the driver's seat 11 to photograph the passengers of the rear seats 13 and 14.

The camera 200 may obtain a facial image by photographing the driver's face, and may process the obtained facial image and transmit it to the controller 600.

In addition, the camera 200 obtains an image of the rear seats 13 and 14 by photographing the space of the rear seats 13 and 14, and may process the obtained images of the rear seats 13 and 14 and transmit it to the controller 600.

For this, the camera 200 may mean any component capable of obtaining an image of a driver and/or an image of a passenger. For example, the camera 200 may employ a Complementary Metal-Oxide-Semiconductor (CMOS) image sensor or a Charge-Coupled Device (CCD) image sensor.

The pressure sensor 300 according to an embodiment of the present disclosure may be provided in the headrest of the driver's seat 11 and may measure a force applied to the headrest. The pressure sensor 300 may be provided to include all areas of the headrest in the horizontal direction, and may measure the force applied to the headrest.

The pressure sensor 300 may transmit data and/or information on the force applied to the headrest to the controller 600. For example, the pressure sensor 300 may transmit data such as an action point and intensity of a force applied to the headrest to the controller 600.

For this, the pressure sensor 300 may employ all types of sensors for measuring the force applied to the headrest.

The transceiver 400 according to an embodiment of the present disclosure may transmit various data and/or information and/or commands to the external terminal device 450 by communicating with the external terminal device 450, and may receive various data and/or information and/or commands from the external terminal device 450.

In this case, the external terminal device 450 may include a passenger terminal device located in the rear seats 13 and 14. For example, the external terminal device may include a passengers smart phone.

For this, the transceiver 400 may be implemented using a communication chip, an antenna, and related components so as to access a wireless communication network. That is, the transceiver 400 may be implemented as various types of communication modules capable of short-range communication or long-distance communication with the external terminal device 450.

The storage 500 according to an embodiment of the present disclosure may store various types of information input from a user. For example, the driver may input a specific frequency band through the AVN device of the vehicle 1, and the storage 500 may store the frequency band input from the driver.

The AVN device of the vehicle 1 outputs sounds of various frequency bands and allows the driver to select a sound that may be most easily heard, thereby receiving a specific frequency band from the driver.

In addition, the storage 500 may store various types of information necessary for control of the vehicle 1, such as various sound processing algorithms and image processing algorithms for extracting a specific object from image data.

As such, the storage 500 may be implemented as at least one of a non-volatile memory devices such as a cache, read only memory (ROM), programmable ROM (PROM), erasable programmable ROM (EPROM), electrically erasable programmable ROM (EEPROM), and flash memory or a volatile memory device such as random access memory (RAM), or a storage medium such as a hard disk drive (HDD) or a CD-ROM in order to store various types of information. However, the present disclosure is not limited thereto, and if it is a type capable of storing various types of information, it may be used as a type of the storage 500.

The controller 600 according to an embodiment of the present disclosure may control various components of the vehicle 1 such as the headrest speaker 700, the display device 800, and the transceiver 400 based on the voice of the passenger received from the microphone 100, the image of the driver and/or the image of the passenger obtained from the camera 200, the information and/or data received from the pressure sensor 300, the command received from the transceiver 400 and various information and/or data received from storage 500.

For example, the controller 600 may generate a masking curve based on a passenger's voice signal received from the microphone 100 and control the headrest speaker 700 to output a masking sound corresponding to the masking curve.

The controller 600 may include at least one memory storing a program for performing the above-described operation and an operation described later, and at least one processor executing the stored program. When there are a plurality of memories and processors, they may be integrated on one chip, or may be provided in physically separate locations.

The headrest speaker 700 according to an embodiment of the present disclosure may include a left speaker 700L provided on the left side of the headrest of the driver's seat 11 to output sound, and a right speaker 700R provided on the right side of the headrest of the drivers seat 11 to output sound.

The headrest speaker 700 may output various sounds according to a control signal of the controller 600 or may output sound output from an AVN device.

The speaker for this purpose may include components such as a voice coil and an amplifier that adjusts the volume of the output sound by adjusting the amount of current supplied to the voice coil.

In addition, the left speaker 700L and the right speaker 700R may output sounds of different volumes according to a control signal from the controller 600.

The display device 800 according to an embodiment of the present disclosure may include a first display device 800F provided in a visible region of a driver and/or a second display device 800B provided in a visible region of a passenger located in the rear seats 13 and 14.

For example, the first display device 800F may include the AVN device of the vehicle 1, a head-up display, and the like, and may include a display provided in a cluster.

In addition, the second display device 800B may include an AVN device (Rear Seat Entertainment (RSE)) provided at the rear of the driver's seat 11 and/or the passenger seat 12.

Various components of the vehicle 1 according to an embodiment of the present disclosure have been described in detail above. Various components of the vehicle 1 described above may be freely changed at the level of the general technical range. Hereinafter, a control method of the vehicle 1 using various components of the vehicle 1 described above will be described in detail.

Figure 3:
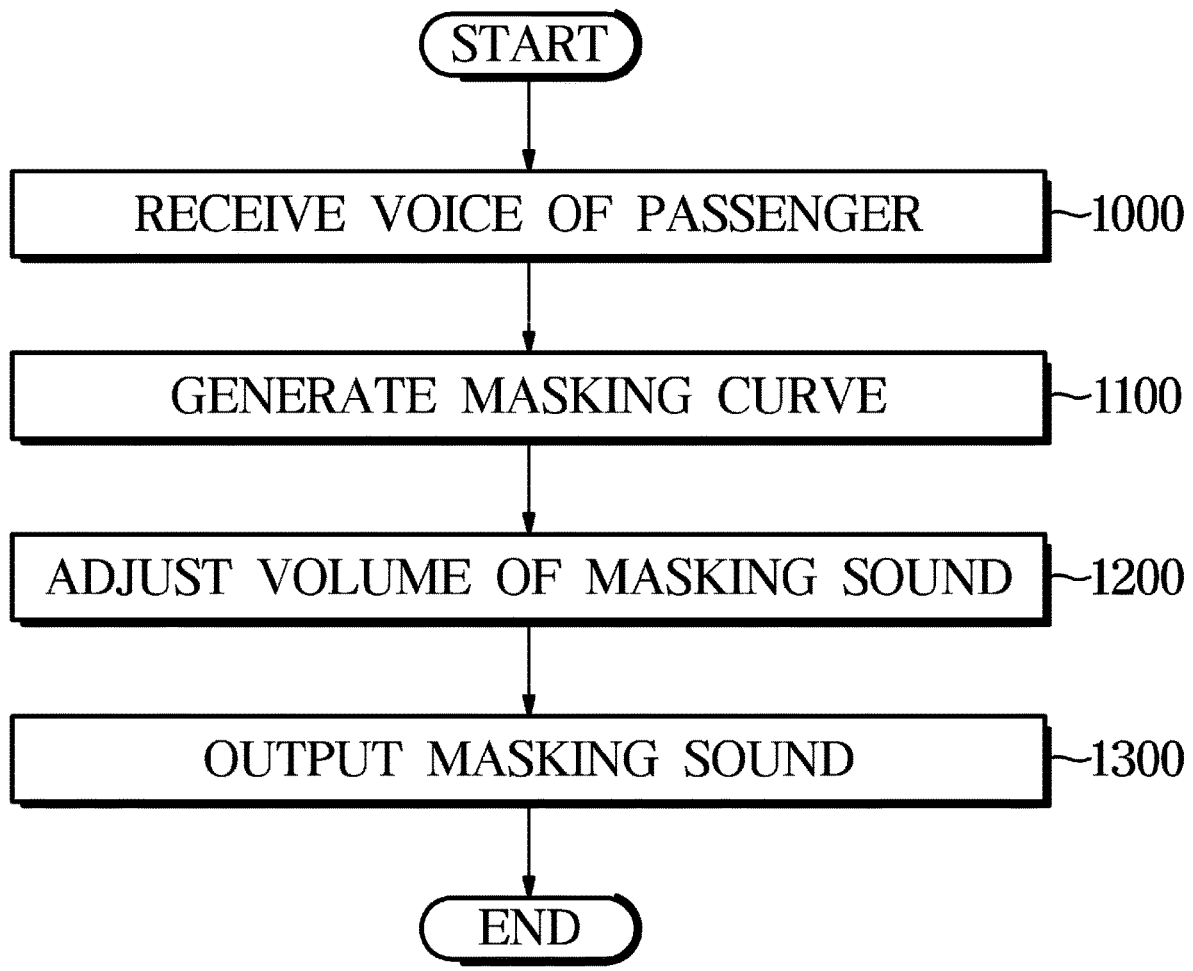
FIG. 3 is a flowchart of a control method of a vehicle according to an embodiment of the present disclosure.
Figure 4:
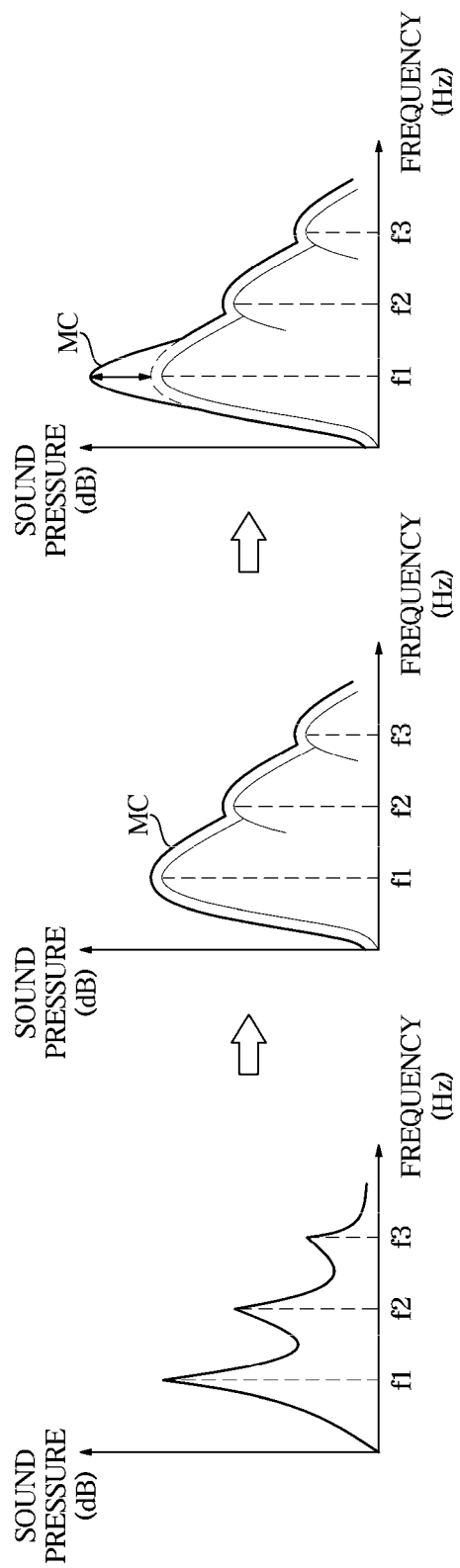
FIG. 4 illustrates an example of a masking curve generated based on a voice of a passenger.
Figure 5:
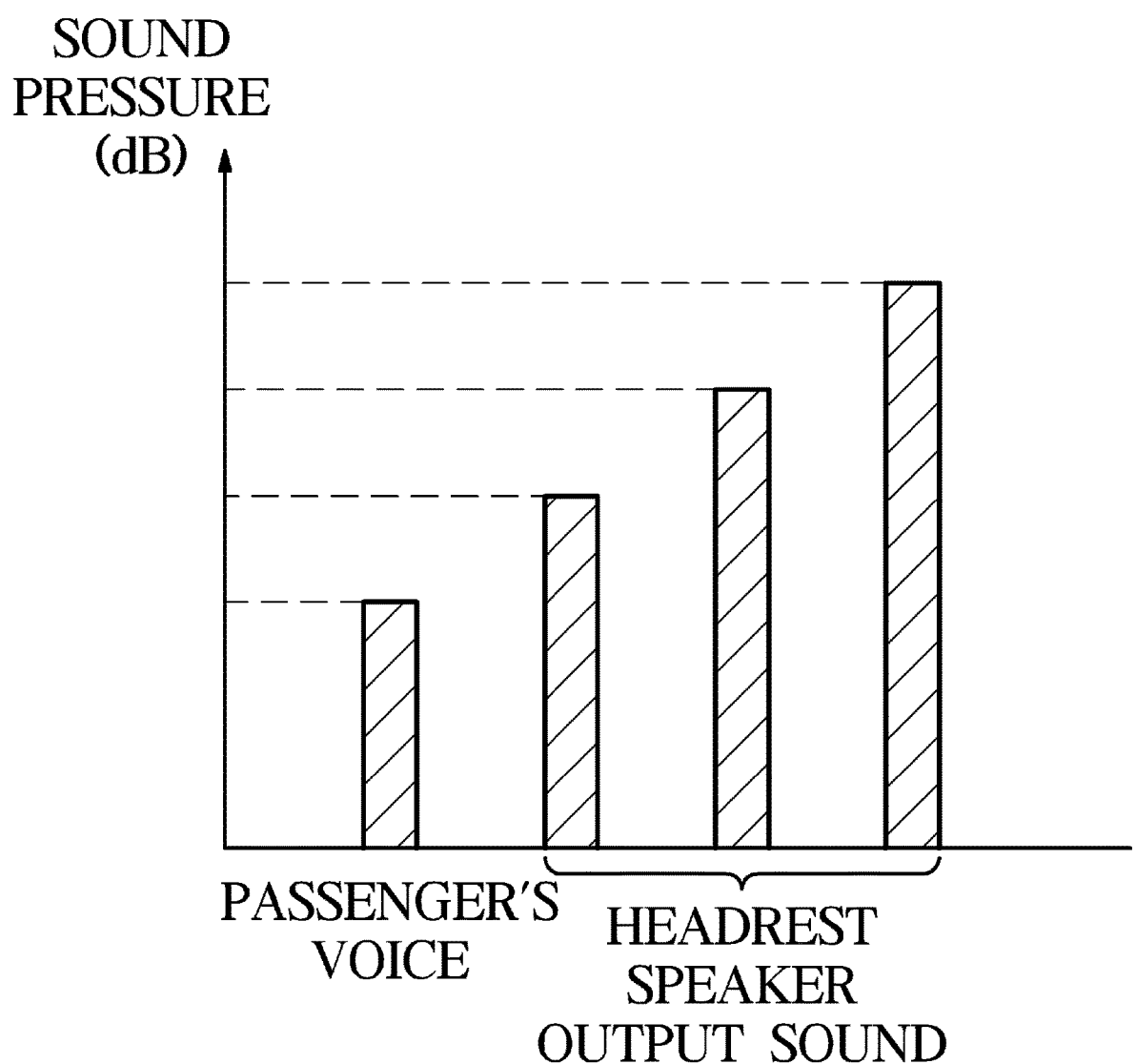
FIG. 5 illustrates a volume of sound output from a headrest speaker according to an embodiment of the present disclosure.
Figure 6:
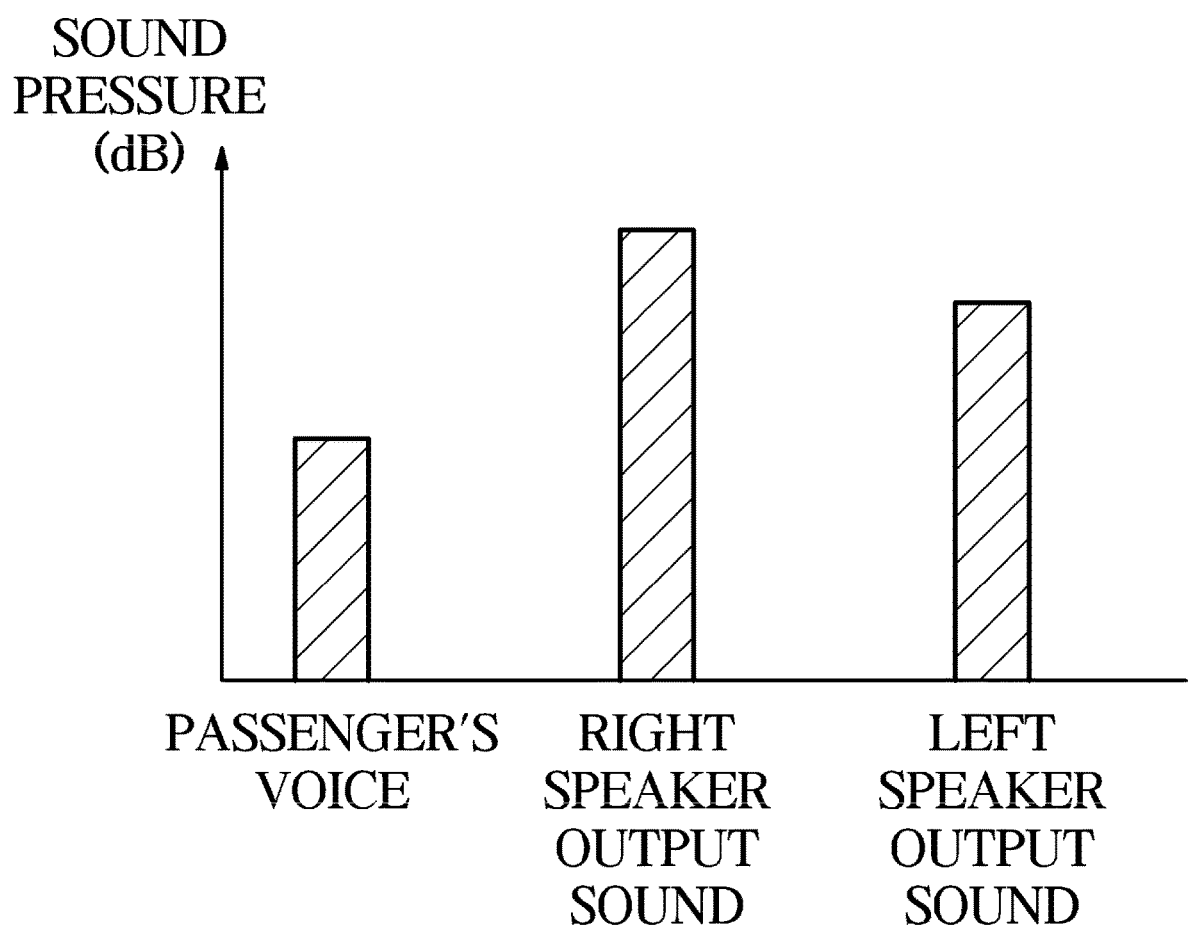
FIG. 6 illustrates the volume of sound output from each of a right speaker and a left speaker according to an embodiment of the present disclosure.
Figure 7A:
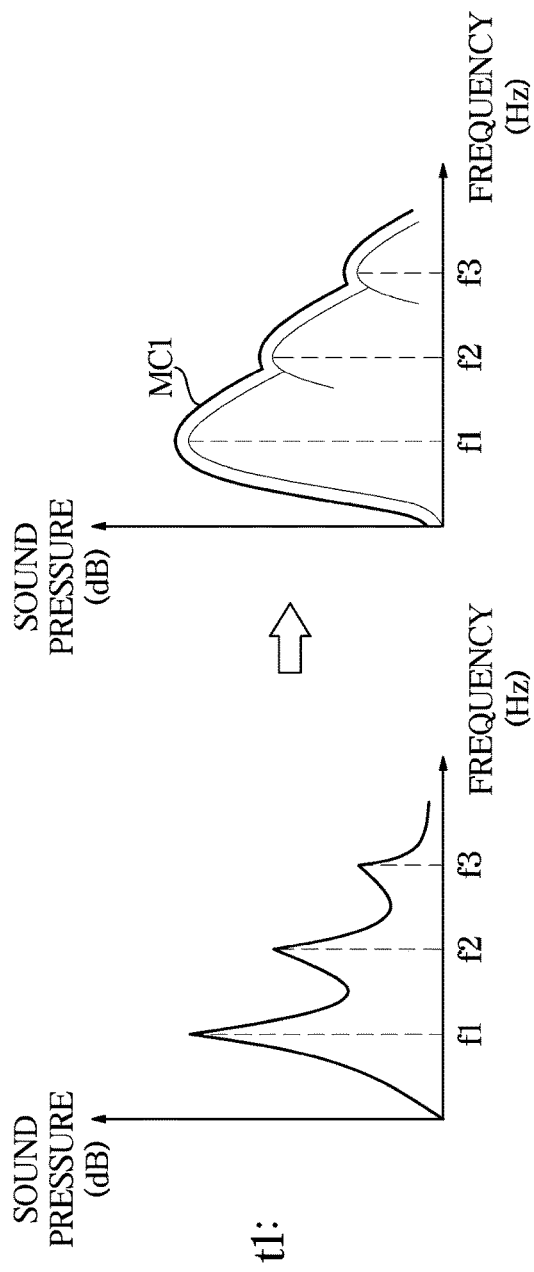
FIGS. 7A and 7B illustrate examples of a masking curve generated between the syllables and the syllables of a voice spoken by a passenger.
Figure 7B:
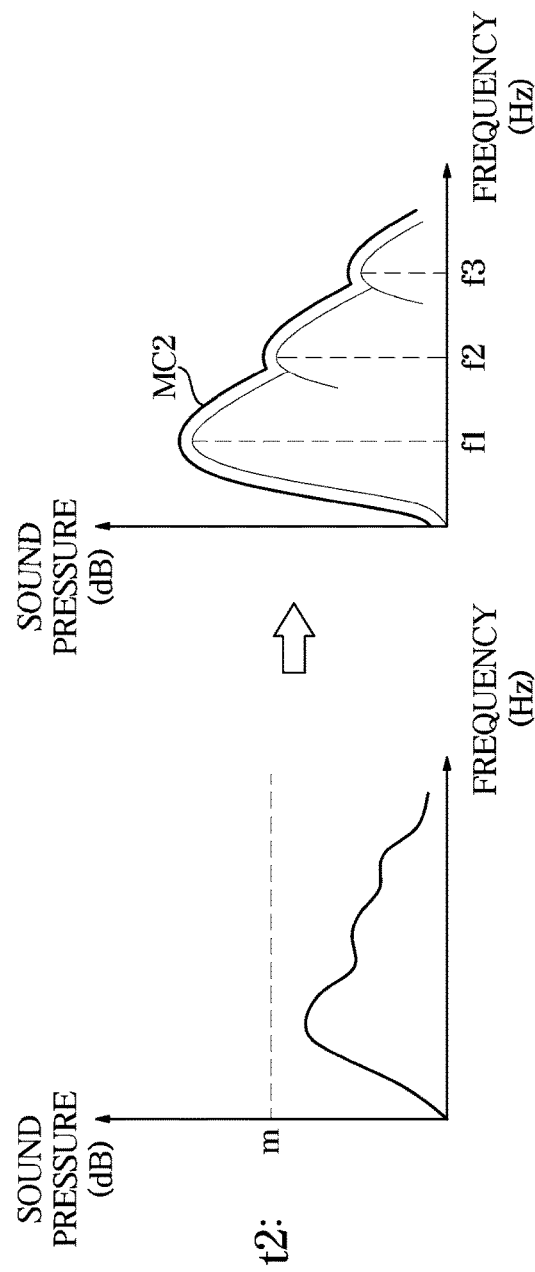
Figure 8:
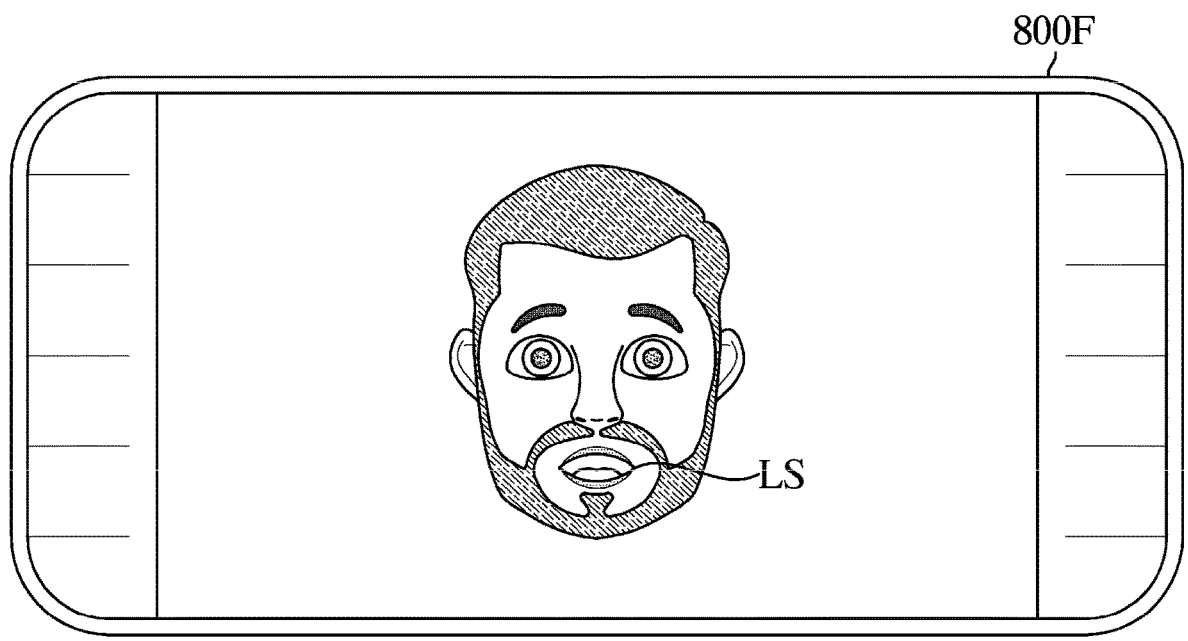
FIG. 8 illustrates an image output to a display device according to an embodiment of the present disclosure.
Figure 9:
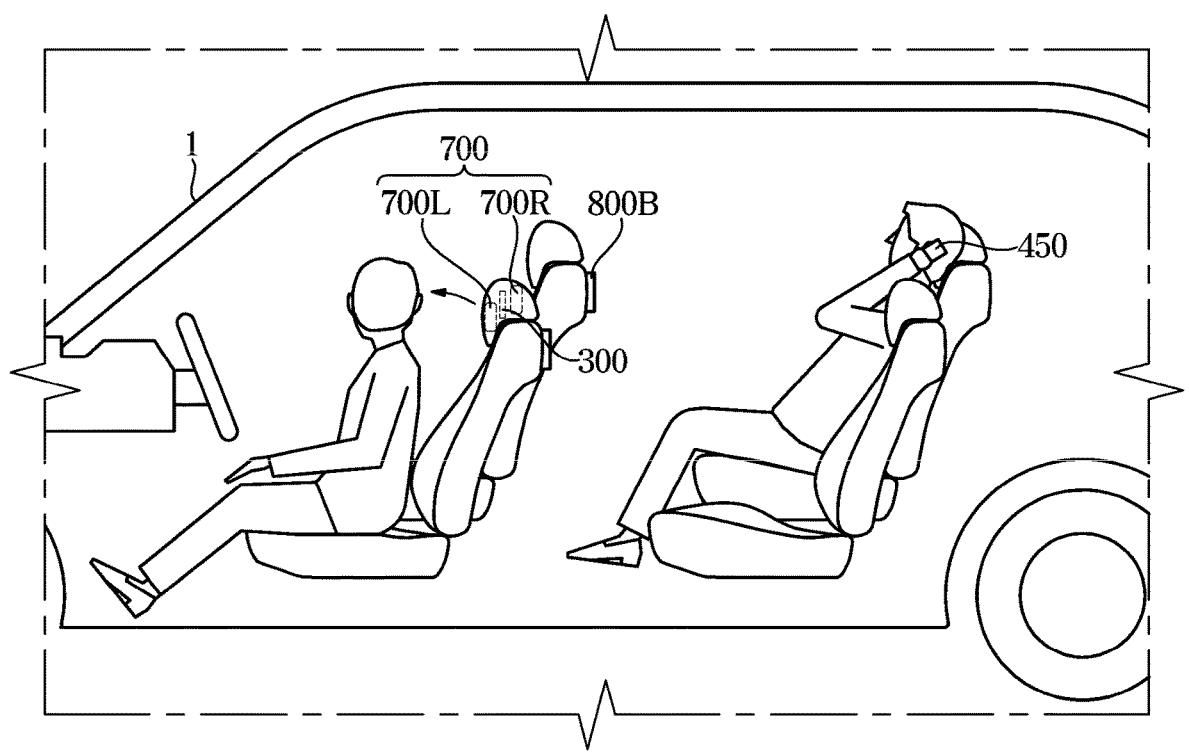
FIG. 9 illustrates a situation in which a driver eavesdrops a passenger's voice.
Figure 10:
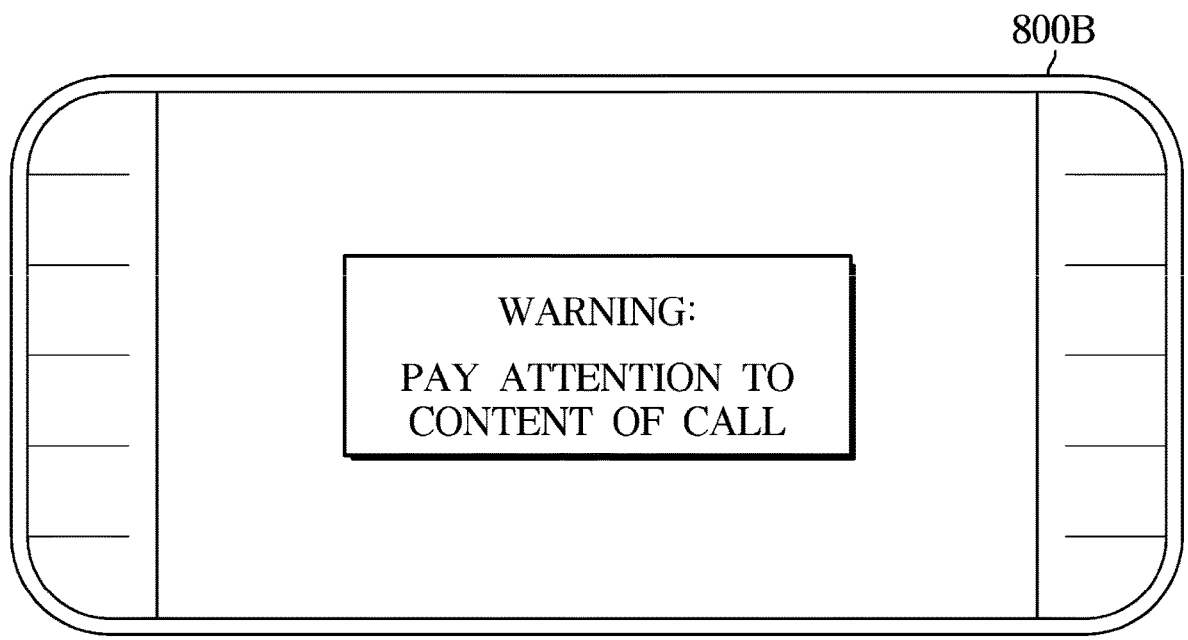
FIG. 10 illustrates an example of a warning output to a display device when a driver eavesdrops a passengers voice.
Figure 11:
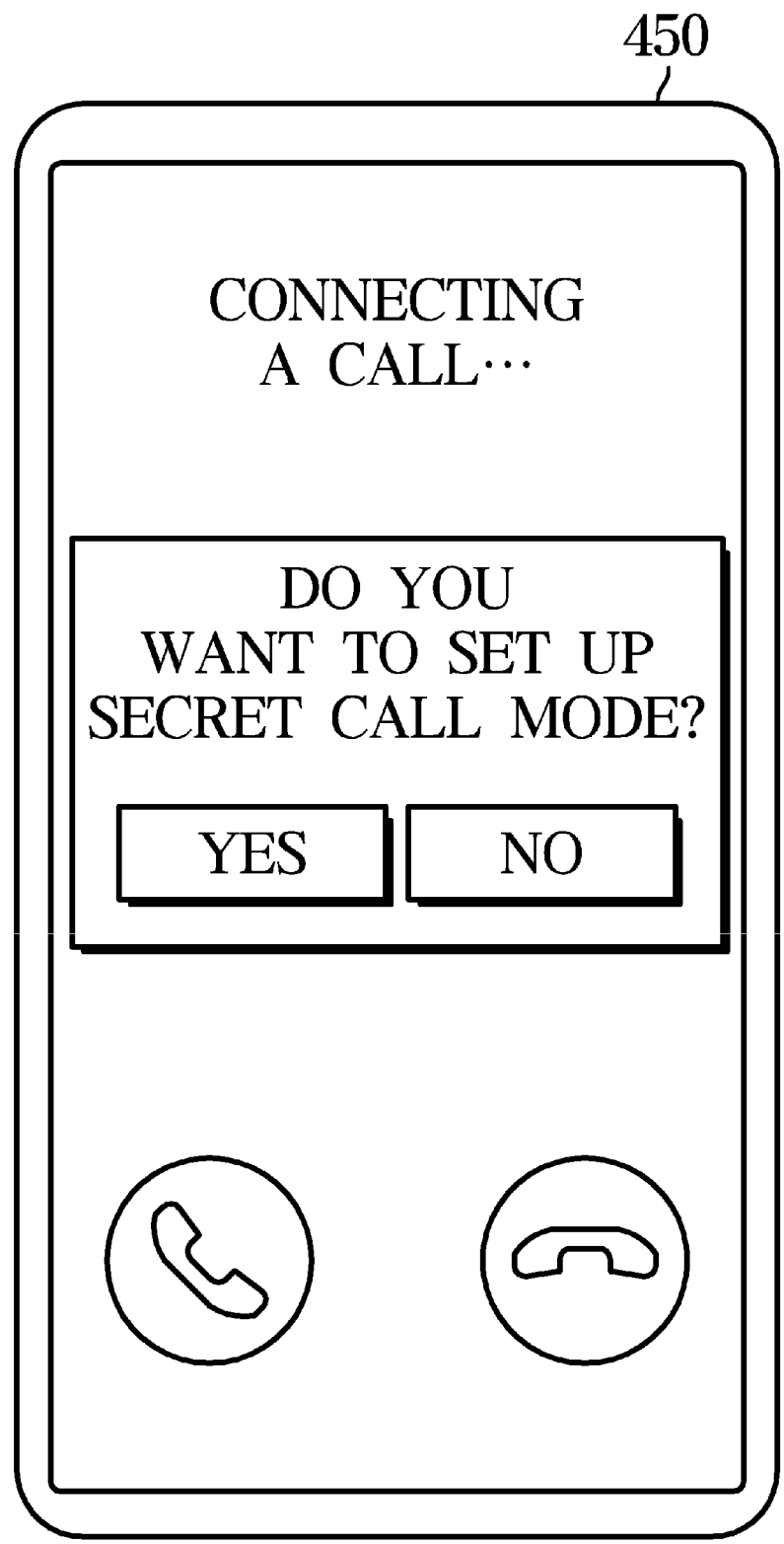
FIG. 11 illustrates an example of a message output to a passenger terminal device.

FIG. 3 is a flowchart of a control method of a vehicle according to an embodiment of the present disclosure. FIG. 4 illustrates an example of a masking curve generated based on a voice of a passenger. FIG. 5 illustrates a volume of sound output from a headrest speaker according to an embodiment of the present disclosure. FIG. 6 illustrates the volume of sound output from each of a right speaker and a left speaker according to an embodiment of the present disclosure. FIGS. 7A and 7B illustrate examples of a masking curve generated between the syllables and the syllables of a voice spoken by a passenger. FIG. 8 illustrates an image output to a display device according to an embodiment of the present disclosure. FIG. 9 illustrates a situation in which a driver eavesdrops a passenger's voice. FIG. 10 illustrates an example of a warning output to a display device when a driver eavesdrops a passengers voice. FIG. 11 illustrates an example of a message output to a passenger terminal device.

Referring to FIG. 3, the microphone 100 may detect the voice signal of the passenger located in the rear seats 13 and 14 and transmit it to the controller 600, and the controller 600 may receive a voice signal of a passenger from the microphone 100 (1000).

The microphone 100 may be activated when the vehicle 1 starts, but may be activated according to a control signal from the controller 600 in a specific situation.

For example, the controller 600 may activate the microphone 100 only when receiving a preset command from the transceiver 400. Referring to FIG. 11, when a passenger makes a call to a third party or receives a call from a third party using the terminal device 450, the passenger may set the secret call mode through the terminal device 450.

The terminal device 450 may transmit a preset command to the transceiver 400 of the vehicle 1, and the transceiver 400 may receive the preset command from the terminal device 450 and transmit it to the controller 600.

When receiving a preset command from the transceiver 400, the controller 600 activates the microphone 100 and generates a masking curve based on the voice of the passenger received from the microphone 100.

That is, the controller 600 may control the headrest speaker 700 and output a masking sound only when the transceiver 400 receives a preset command.

In addition, when the transceiver 400 receives a preset command, the controller 600 may output a preset voice by controlling the headrest speaker 700. In this case, the preset voice may be a voice requesting the driver to lean his head against the headrest. For example, a preset voice could be a voice such as "Let your head on the headrest".

Referring back to FIG. 3, the controller 600 may generate a masking curve based on the passenger's voice signal received from the microphone 100 (1100).

Specifically, the controller 600 may determine at least one peak sound pressure included in the passenger's voice, and generate a masking curve in which a frequency corresponding to the peak sound pressure is a center frequency.

Referring to FIG. 4, there may be three frequencies f1, f2, and f3 corresponding to the peak sound pressure included in the voice of the passenger. The controller 600 may determine a peak sound pressure included in a passenger's voice and generate a masking curve MC using three frequencies f1, f2, and f3 corresponding to the peak sound pressure as a center frequency.

The peak sound pressure may mean the inflection point of the sound pressure when the passenger's voice signal is analyzed in the frequency band.

In general, human voice is composed of fundamental frequency and harmonics, and among them, the energy of fundamental frequency is the strongest.

Accordingly, it is most efficient to generate a masking curve with the fundamental frequency as the center frequency.

Therefore, the controller 600 determines a frequency f1 corresponding to the peak sound pressure having the largest sound pressure among at least one peak sound pressure included in the passenger's voice as the fundamental frequency, and may boost the sound pressure of the masking curve MC at a frequency f1 corresponding to the peak sound pressure having the largest sound pressure among at least one peak sound pressure.

Thereafter, the controller 600 may output the electrical signal corresponding to the generated masking curve MC to the amplifier of the headrest speaker 700 so that the headrest speaker 700 outputs the masking sound (1300), in this case, may adjust the volume of the masking sound output to the headrest speaker 700 (1200).

Specifically, the controller 600 may control the volume of sound output to the headrest speaker 700 based on the sound pressure size of the passenger's voice.

Referring to FIG. 5, the passenger may set the volume of sound output to the headrest speaker 700 to any one of 'low, medium, and high', and the controller 600 may adjust the volume of sound output to the headrest speaker 700 based on the passenger's setting.

For example, assuming that the sound pressure of the passenger's voice is 60 dB, when the volume of the headrest speaker 700 is set to 'low', the sound output to the headrest speaker 700 may have a volume of 63 dB, which is 3 dB larger than 60 dB. When the volume of the headrest speaker 700 is set to 'medium', the sound output to the headrest speaker 700 may have a volume of 66 dB, which is 6 dB larger than 60 dB. When the volume of the headrest speaker 700 is set to "high", the sound output to the headrest speaker 700 may have a volume of 69 dB, which is 9 dB greater than 60 dB.

That is, the controller 600 may control the headrest speaker 700 so that the volume size of the sound output to the headrest speaker 700 becomes larger than the sound pressure size of the passenger's voice regardless of the volume setting of the headrest speaker 700.

As another example, the controller 600 receives the image of the rear seats 13 and 14 from the camera 200, determines the position of the passenger based on the image of the rear seats 13 and 14, and then may adjust the volume of sound output to the left speaker 700L and the right speaker 700R based on the position of the passenger.

Specifically, the controller 600 may equally adjust the volume of the left speaker 700L and the right speaker 700R when the passenger is located in the first rear seat 13 which is the rear seat of the driver's seat 11. Further, referring to FIG. 6, when the passenger is located in the second rear seat 14, which is the rear seat of the passenger seat 12, the controller 600 may adjust the volume of sound output to the right speaker 700R to be higher than the volume of sound output to the left speaker 700L.

This is because when the passenger is located in the second rear seat 14, the driver's right ear is closer to the passenger, and the passenger's voice delivered to the driver's right ear is larger than the passengers voice delivered to the drivers left ear.

As another example, the controller 600 may receive the image of the driver from the camera 200, determine the position of the ear of the driver based on the image of the driver, and then may adjust the volume of sound output to the left speaker 700L and the right speaker 700R based on the position of the driver's ear.

Specifically, the controller 600 may reduce the volume of sound output to the left speaker 700L or the right speaker 700R as the driver's ear is closer to the left speaker 700L or the right speaker 700R, and may increase the volume of sound output to the left speaker 700L or the right speaker 700R as the driver's ear is farther from the left speaker 700L or the right speaker 700R.

Accordingly, the voice of the passenger may be effectively blocked from the driver.

In general, human voice has different characteristics from general sound. While general sound does not change in frequency over time, human voice has a large change in frequency over time.

According to this phenomenon, a person may collect a lot of information by recognizing the change in the frequency of the voice over a short period of time. That is, there is an interval period between the syllables and the syllables of the voice, and a person may effectively recognize the rapid frequency change through the interval period.

When considering the above phenomenon, when the headrest speaker 700 is controlled to output the masking sound during the interval that exists between the syllables and the syllables of the voice, the driver cannot recognize the conversation contents of the passenger.

Referring to FIGS. 7A and 7B, when the sound pressure of the voice of the passenger is less than or equal to the preset sound pressure, the controller 600 may control the headrest speaker 700 to output a masking sound corresponding to the masking curve MC1 generated before a preset time t1.

Specifically, when the sound pressure of the passengers voice received at a specific time point t2 is less than or equal to the preset sound pressure m, the controller 600 may generate the same masking curve MC2 as the masking curve MC1 generated at a time point t1 before a preset time from a specific time point t2, and may control the headrest speaker 700 to output a masking sound corresponding to the generated masking curve MC2.

According to the above embodiment, the period in which the sound pressure of the passengers voice is less than or equal to the preset sound pressure is determined as an interval period existing between the syllables and the syllables of the voice, and a masking sound corresponding to the masking curve previously generated during the interval period is output. By doing so, the voice of the passenger may be efficiently blocked from the driver.

Although not shown in FIG. 3, the vehicle 1 according to an embodiment of the present disclosure may prevent the driver from recognizing voice information by providing visual information to the driver in addition to audibly blocking the voice of the passenger.

For example, the controller 600 receives data related to the speed of the vehicle 1 through CAN communication, when the vehicle 1 is stopped, may control the first display device 800F to output an image including the mouth shape LS of a person.

Referring to FIG. 8, an image output through the first display device 800F may be checked. An image including a mouth shape LS may mean a video including a scene in which a person's mouth shape LS changes from time to time. The image including the mouth shape LS may be previously stored in the storage 500.

When the vehicle 1 stops as above, it is possible to effectively block the voice of the passenger from the driver by visually disturbing the driver by showing the random mouth shape of the person.

In addition, the vehicle 1 according to an embodiment of the present disclosure may prevent a security accident about conversation contents by giving attention to a passenger.

For example, when the driver has his eyes closed, the driver may focus on the passenger's voice. Accordingly, the controller 600 recognizes the driver's eyes based on the driver's image obtained from the camera 200, and may output a warning through the second display device 800B when the drivers eyes are closed for a preset time.

In addition, referring to FIG. 9, when the driver removes the head from the headrest, the distance between the driver and the headrest speaker 700 may increase, so that the voice of the passenger may leak. Accordingly, the controller 600 may output a warning through the second display device 800B when the force measured from the pressure sensor 300 is less than or equal to a preset size.

When the force measured from the pressure sensor 300 is less than or equal to a preset size, it may mean that the driver's head is spaced apart from the headrest.

In this case, the warning output through the second display device 800B may be a visual warning or an audible warning.

Referring to FIG. 10, an example of a warning message output through the second display device 800B may be checked.

On the other hand, when the masking sound is output from the headrest speaker 700 while the driver is driving the vehicle 1, the driver may not recognize the warning sound output from the AVN device due to the masking sound.

To prevent this, the driver may input a frequency band that may be most easily heard by the driver through an input device of the vehicle 1 such as an AVN device in advance, and the storage 500 may store the frequency band input from the driver. The controller 600 may set the frequency band of the sound output from the AVN device to the frequency band stored in the storage 500, and when the sound is output from the AVN device, may lower the sound pressure of the masking curve in the frequency band stored in the storage 500. That is, the controller 600 may generate a masking curve in which the sound pressure is reduced in the frequency band stored in the storage 500.

Accordingly, even when the masking sound is output from the headrest speaker 700, the driver may easily listen to sound such as a warning sound output from the AVN device.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present disclosure have been shown and described, it would be appreciated by those skilled in the art that changes may be made to these embodiments without departing from the principles and spirit of the present disclosure, the scope of which is defined in the claims and their equivalents.

According to the present disclosure, it is possible to effectively prevent the driver from eavesdropping on the voice of the passenger.

In addition, when the driver intentionally attempts to listen to the voice of a passenger in the rear seat, it is possible to prevent a security accident by warning the passenger.

What is claimed is:

1. A vehicle comprising:
a driver's seat having a headrest speaker in a headrest thereof, the headrest speaker configured to output a sound;
a front passenger seat;
at least one rear passenger seat;
a microphone configured to detect a voice of a passenger seated on the at least one rear passenger seat; and
a controller configured to generate a masking curve based on the voice of the passenger and output a masking sound corresponding to the masking curve by controlling the headrest speaker,
wherein the controller is configured to control a volume of a sound output to the headrest speaker based on a sound pressure size of the voice of the passenger.

2. The vehicle according to claim 1, wherein the controller is configured to determine at least one peak sound pressure in the voice of the passenger and generate the masking curve with a frequency corresponding to the at least one peak sound pressure as a center frequency.

3. The vehicle according to claim 2, wherein the controller is configured to boost a sound pressure of the masking curve at the frequency corresponding to a peak sound pressure having a largest sound pressure among the at least one peak sound pressure.

4. The vehicle according to claim 1, further comprising a camera configured to photograph the passenger,
wherein the headrest speaker comprises:
a left speaker arranged on a left side of the headrest of the driver's seat and configured to output sound; and
a right speaker arranged on a right side of the headrest of the driver's seat and configured to output sound, and
wherein the controller is configured to adjust a volume of sound output to the left speaker and the right speaker based on a position of the passenger photographed from the camera.

5. The vehicle according to claim 4, wherein, when the passenger is seated on the at least one rear passenger seat, the controller is configured to adjust the volume of the sound output to the right speaker higher than the volume of the sound output to the left speaker.

6. The vehicle according to claim 1, further comprising a camera configured to photograph a driver seated on the driver's seat,
wherein the headrest speaker comprises:
a left speaker arranged on a left side of the headrest of the driver's seat and configured to output sound; and
a right speaker arranged on a right side of the headrest of the driver's seat and configured to output sound, and
wherein the controller is configured to determine a position of an ear of the driver photographed from the camera, and increase a volume of sound output to the left speaker or the right speaker as the driver's ear is farther from the left speaker or the right speaker.

7. The vehicle according to claim 1, wherein, when a sound pressure of the voice of the passenger is less than or equal to a preset sound pressure, the controller is configured to output the masking sound corresponding to the masking curve generated before a preset time point by controlling the headrest speaker.

8. The vehicle according to claim 7, wherein, when the sound pressure of the voice of the passenger is less than or equal to the preset sound pressure, the controller is configured to increase a volume of a sound output to the headrest speaker.

9. The vehicle according to claim 1, further comprising a display device disposed in front of the driver's seat,
wherein, when the vehicle is in a stop state, the controller is configured to output an image comprising a shape of a person's mouth by controlling the display device.

10. The vehicle according to claim 1, further comprising:
a camera configured to photograph a driver seated on the driver's seat; and
a display device arranged at the rear side of the driver's seat or at a rear side of the front passenger seat,
wherein the controller is configured to recognize the driver's eyes based on the image obtained from the camera, and output a warning through the display device when the driver's eyes close for a preset time.

11. The vehicle according to claim 1, further comprising:
a pressure sensor configured to measure a force applied to the headrest of the driver's seat; and
a display device arranged at the rear side of the driver's seat or a rear side of the front passenger seat,
wherein the controller is configured to output a warning through the display device when the force measured by the pressure sensor is less than or equal to a preset size.

12. The vehicle according to claim 1, further comprising:
an Audio/Video/Navigation (AVN) device; and
a storage configured to store a frequency band input from the driver,
wherein the controller is configured to set the frequency band of sound output from the AVN device to the frequency band stored in the storage, and decrease a sound pressure of the masking curve in the frequency band stored in the storage when sound is output from the AVN device.

13. The vehicle according to claim 1, further comprising a transceiver configured to receive a preset command from a terminal device of the passenger, wherein the controller is configured to output the masking sound by controlling the headrest speaker only when the transceiver receives the preset command.

14. The vehicle according to claim 13, wherein the controller is configured to output a preset voice by controlling the headrest speaker when the transceiver receives the preset command.

15. A control method of a vehicle, which comprises: a driver's seat having a headrest speaker in a headrest thereof, the headrest speaker configured to output a sound, a front passenger seat, at least one rear passenger seat, and a microphone configured to detect a voice of a passenger seated on the at least one rear passenger seat, the method comprising:
receiving the voice of the passenger from the microphone;
generating a masking curve based on the voice of the passenger;
outputting a masking sound corresponding to the masking curve by controlling the headrest speaker; and
controlling a volume of sound output to the headrest speaker based on a sound pressure size of the voice of the passenger.

16. The control method according to claim 15, wherein the generating a masking curve based on the voice of the passenger comprises:
determining at least one peak sound pressure of the voice of the passenger; and
generating the masking curve with a frequency corresponding to the at least one peak sound pressure as a center frequency.

17. The control method according to claim 16, wherein the generating the masking curve with the frequency corresponding to the at least one peak sound pressure as the center frequency comprises boosting a sound pressure of the masking curve at a frequency corresponding to a peak sound pressure having a largest sound pressure among the at least one peak sound pressure.

18. The control method according to claim 15, further comprising adjusting a volume of sound output to a left speaker and a right speaker of the headrest speaker based on a position of the passenger.

* * * * *